United States Patent [19]

Chaban et al.

[11] Patent Number: 5,529,378
[45] Date of Patent: Jun. 25, 1996

[54] MOVABLE VEHICLE SEAT ASSEMBLY WITH IMPROVED LATCH

[75] Inventors: Philip Chaban, Grass Lake; Wojciech Wdziekonski, Detroit, both of Mich.

[73] Assignee: Hoover Universal, Inc., Plymouth, Mich.

[21] Appl. No.: 324,225

[22] Filed: Oct. 17, 1994

[51] Int. Cl.⁶ .................... B60N 2/08; B60N 2/30
[52] U.S. Cl. ............... 297/331; 297/335; 297/344.1; 297/463.1
[58] Field of Search .................... 297/335, 336, 297/331, 332, 463.1, 344.1; 248/393, 394, 395; 296/63, 65.1

[56] References Cited

U.S. PATENT DOCUMENTS

| | | | |
|---|---|---|---|
| 4,157,797 | 6/1979 | Fox | 297/332 |
| 4,721,277 | 1/1988 | Hessler et al. | 248/394 |
| 4,770,386 | 9/1988 | Hessler et al. | 248/394 |
| 5,106,144 | 4/1992 | Hayakawa et al. | 296/65.1 |
| 5,156,438 | 10/1992 | Hayakawa et al. | 297/335 |
| 5,195,802 | 3/1993 | Hayakawa et al. | 297/335 |

*Primary Examiner*—Peter M. Cuomo
*Assistant Examiner*—Anthony D. Barfield
*Attorney, Agent, or Firm*—Harness, Dickey & Pierce

[57] ABSTRACT

A vehicle seat assembly which is movable between at least one use position in the vehicle end at least one storage location, and in which a seat component, such as a seat cushion, is movable between non-operative and operative positions. The seat assembly has a single latch for both holding the seat in a given location within the vehicle as well as holding the movable seat component in its non-operative position. The latch includes a single operating handle which is movable in opposite directions to either release the seat for movement within the vehicle or to release the movable seat component from its non-operative position. The latch further includes lockout means to prevent the seat from being moved within the vehicle unless the movable seat component is in its non-operative position, and to prevent the movable seat component from being released from its non-operative position unless the seat is in a designated use location in the vehicle.

16 Claims, 4 Drawing Sheets

MOVABLE VEHICLE SEAT ASSEMBLY WITH IMPROVED LATCH

BACKGROUND AND SUMMARY OF THE INVENTION

The present invention relates to vehicle seat assemblies which are movable between at least one use location in a vehicle and at least one storage location and in which a seat component, such as the seat cushion, is movable between operative and non-operative positions. In particular, the invention relates to a single latch for both holding the seat in place within the vehicle, as well as, holding the movable seat component in its non-operative position.

Vans and other multi-purpose passenger vehicles are being designed with flexible seating systems that offer a number of options in how the vehicle seats are configured. As an example, a van may be offered with three rows of seats, a front row of seats permanently installed in the vehicle, a middle row of seats which can be removed from the vehicle and a rear bench seat, which is movable along a track between a rear use location and a middle use location when the middle row of seats have been removed. In addition, the bench seat can be moved to a pair of storage locations, one immediately behind the middle row of seats and another immediately behind the front row of seats when the middle row of seats have been removed.

In order to move the bench seat to its storage locations, the seat cushion is raised from its horizontal operative position to an upright non-operative position, immediately in front of the seat back. Such a seat requires a first latch for holding the seat cushion in the upright non-operative position, a second latch for locking the seat to the track in the vehicle floor in the use and storage locations, and a third latch or memory mechanism which distinguishes between the use locations and the storage locations of the seat for operation of the seat cushion latch.

The use locations of the seat are defined by the presence of seat belts or other restraints in the vehicle. It is necessary to prevent use of the seat when the seat is not in one of the use locations. To accomplish this, some type of interlock is required to couple the seat cushion latch to the seat track latch to ensure that the seat cushion can only be moved to its operative position when the entire seat is latched to the vehicle floor at a use location. Such an interlock between the cushion latch and the track latch results in a complicated mechanism with a high amount of tolerance stack up. Furthermore, the mechanism can be difficult to learn how to operate.

Accordingly, it is an object of the present invention to provide a single multifunction latch for such vehicle seats which is easily operated by a single operating handle.

The seat latch of the present invention has a single "towel bar" operating handle extending across the front of the seat. The handle is raised to release the seat from the track in the vehicle floor for moving the seat between use and storage locations. The handle is lowered to release the seat cushion from its non-operative upright position, allowing the seat cushion to be rotated to its horizontal operative position. To prevent movement of the seat from a use location when the seat cushion is not in its storage position, the latch includes a cam which only allows the towel bar operating handle to be raised, releasing the seat for movement in the vehicle, when the seat cushion is in its non-operative storage position. Likewise, a second cam prevents release of the seat cushion from its non-operative position unless the seat is latched at a use location.

The latch includes two latch pawls, a seat latch pawl and a cushion latch pawl, each are engageable with separate latch plates to hold the seat in place and the seat cushion in place. The seat latch pawl engages the seat track, which functions as a seat latch plate, in both the use locations and the storage locations of the seat to hold the seat in place in the vehicle. However, only when the seat latch pawl is engaged with the track at one of the seat use locations will the latch enable release of the seat cushion from its non-operative position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
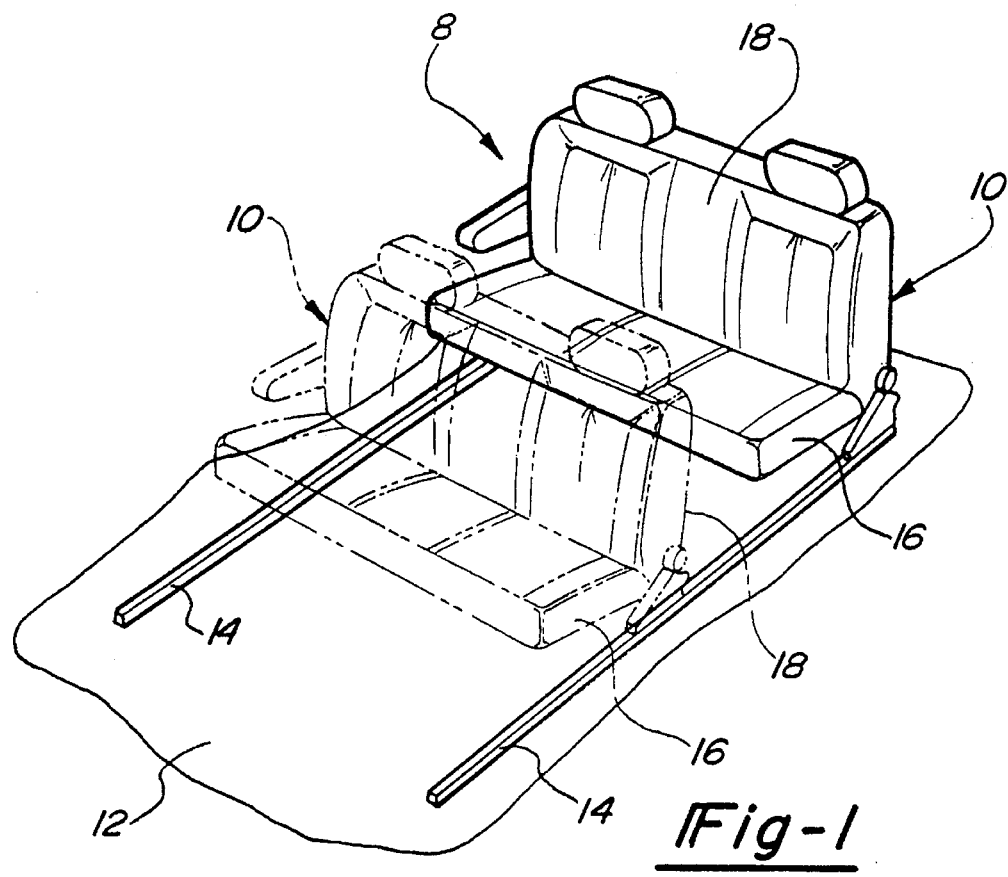
FIG. 1 is a perspective view of a vehicle floor pan with the seat of the present invention shown in multiple use locations.

The seat assembly of the present invention is shown in FIG. 1 and designated generally at 8. The seat assembly 8 is shown installed on the floor structure 12 of a motor vehicle body and includes a pair of elongated tracks 14, which are embedded in and attached to the floor structure 12 and a seat 10. The seat 10 includes a body supporting seat cushion 16, a back rest 18 and a slide car 31 (shown and described below). The seat cushion 16 is shown in a generally horizontal use position in which a passenger can be seated upon the cushion. The back rest 18 is generally upright at the rear of the cushion.

The seat 10 can be moved forward along the tracks 14 to a second row location and used there to provide increased cargo capacity in the vehicle behind the seat 10. This middle row location of the seat 10 is shown in broken line in FIG. 1. This middle row location is only available when removable middle row seats have been removed from the vehicle. Both the solid and broken line positions of the seat 10 in FIG. 1 are designated as use locations in which the seat 10 can be used by a passenger. The specific use locations in the vehicle for the seat are dictated by the location of passenger restraints, such as seat belts, which are connected to the vehicle body.

Figure 2:
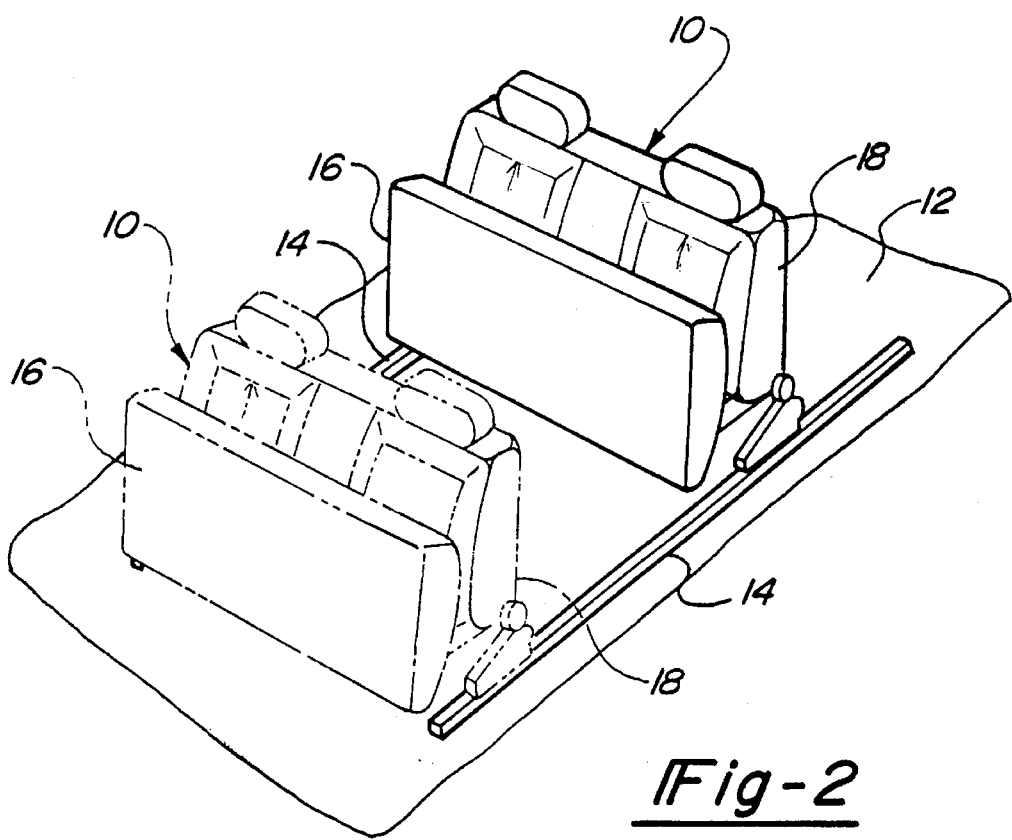
FIG. 2 is a perspective view of a vehicle floor pan with the seat of the present invention shown in multiple storage locations.

With reference to FIG. 2, the seat 10 is shown in two storage locations. To move the seat to one of the storage locations, the cushion 16 must be rotated from its generally horizontal operative position to a generally upright, non-operative position, immediately in front of the back rest 18. In this position, a passenger cannot be seated on the cushion 16. As shown in the solid line in FIG. 2, the seat 10 has one storage location slightly forward from its rear use location to increase the cargo capacity of the vehicle behind the seat 10. This storage location is immediately behind the middle row seats. In the, broken line position of FIG. 2, the seat 10 has been moved further forward to a second storage location immediately behind the front row of seats to further increase the cargo capacity behind the seat 10. This forward most storage location is only available when the middle row seats have been removed from the vehicle. As can be seen, the seat 10 provides versatility in the configuration of the vehicle seating, depending upon the particular needs of the vehicle user.

Since the seat is to be used only when it is at a use location, it is desirable to prevent the cushion 16 from being moved from its non-operative position unless the seat is at one of the use locations. Likewise, it is also desirable to prevent the seat 10 from being moved from one of the use locations unless the cushion is first moved to its non-operative position. The seat 10 includes a latch 20 which holds the seat in one of the use or storage locations and which also holds the cushion 16 in its non-operative position. The latch 20 is shown and described in FIGS. 3–7 and includes a single handle 22 to operate the latch. The handle 22 spans across the front of the seat 10 and is commonly referred to as a "towel bar" handle.

Figure 3:
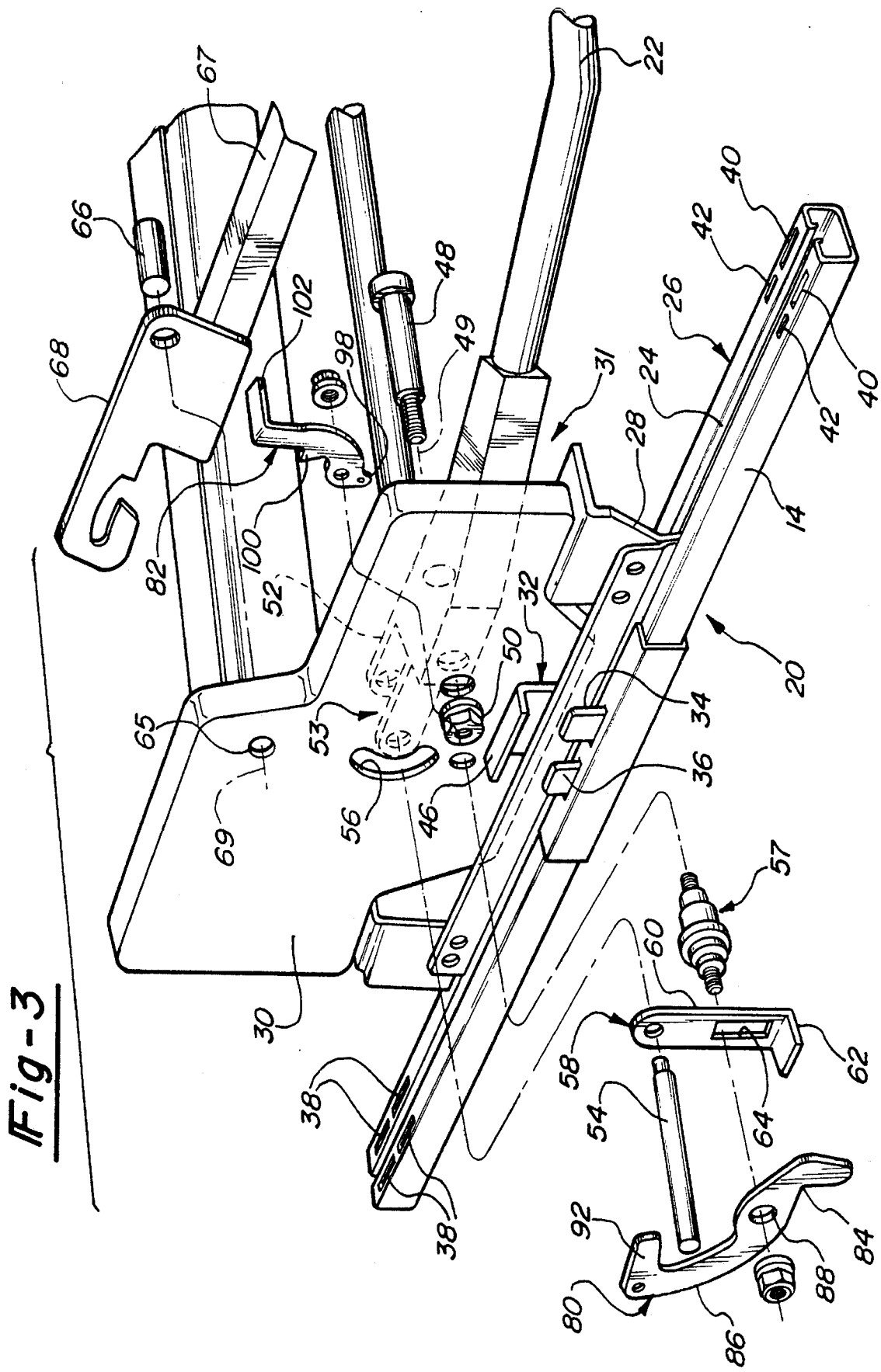
FIG. 3 is an exploded perspective view of the latch of the present invention.

With reference to FIG. 3, the latch 20 is shown in detail. One fixed track 14 is shown which extends fore and aft of the vehicle and is attached to the vehicle floor structure. The fixed track 14 is generally C-shaped in section having an open slot 24 in the top wall 26 of the track. A slide rail 28 is mounted to the track 14 for movement fore and aft along the length of the track 14 in a conventional manner for adjustable seats. A slide rail 28 extends upwardly through the slot 24. Attached to the slide rail 28 is a vertical riser 30. The slide rail 28 and riser 30 together form a slide car 31 which moves along the track 14 and forms a platform for the cushion 16 and back rest 18. The riser, cushion and back rest form as what is referred to as the seat 10, while the seat assembly 8 includes the tracks 14.

Figure 4:
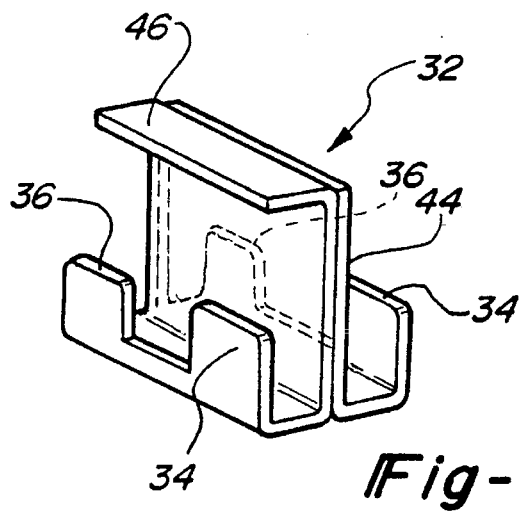
FIG. 4 is a perspective view of the track pawl.

The latch 20 includes a seat latch pawl 32 which is shown in greater detail in FIG. 4. The, pawl 32 has two long teeth 34 and two short teeth 36. The teeth 34, 36 extend upward through apertures 38 in the top wall 26 of the rail 14 at the use locations of the seat 10 to lock the slide car 31 in the use locations. This is a raised position of the seat latch pawl. At a storage location, the top wall 26 has two pairs of apertures 40, 42. The apertures 42 are narrower than the short teeth 36 so that the short teeth 36 do not project through the track top wall 26. Only the teeth 34 project through apertures 40 in the top wall 26 when the seat is at a storage location. The teeth 34 are larger than the teeth 36, so that the teeth 34 can project through the top wall 26 while the short teeth 36 remain beneath the top wall 26 of the track 14. This is an intermediate position of the seat latch pawl.

The pawl 32 has a central web 44 extending vertical through the slot 24 in the track. The upper portion of the web 44 is bent over, forming a horizontal top ledge 46. When the seat is at a use location and both pairs of teeth 34, 36 extend through the top wall of the track, the pawl and its ledge 46 are positioned higher than when the seat is at a storage location and the short teeth 36 remain below the track top wall 26.

The operating handle 22 is pivotally mounted to the riser 30 by the pivot pin 48 and nut 50 and rotates about the transverse axis 49. An extension 52 of the operating handle extending rearward of the pivot pin 48 is forked and carries a pin 54 which also functions as a cushion pawl as described below. The pin 54 is parallel to the axis 49 and is spaced therefrom to move in an arc as the handle is rotated. The pin 54 extends through an arcuate slot 56 in the riser 30 to the outboard side of the riser. A pusher 58 is mounted to the pin 54 for up and down motion with the pin. The pusher 58 is a vertically extending plate 60 that is bent at its lower end forming a horizontal tab 62. The pusher includes a slot 64 which enables another pivot pin 57, described below, to pass through the pusher, enabling the pusher 58 to move vertically around the pivot pin 57.

When the towel bar 22 is raised, the rear extension 52 of the towel bar is lowered and the pin 54 travels downward through the slot 56, lowering the pusher 58. The horizontal tab 62 of the pusher, when lowered, engages the horizontal ledge 46 of the seat latch pawl 32 and pushes the pawl 32 downward to a lowered position, disengaging both the long teeth 34 and the short teeth 36 from the apertures in the track 14. Once the seat latch pawl 32 is disengaged from the track, the seat 10 is able to be moved fore and aft within the vehicle.

Figure 5:
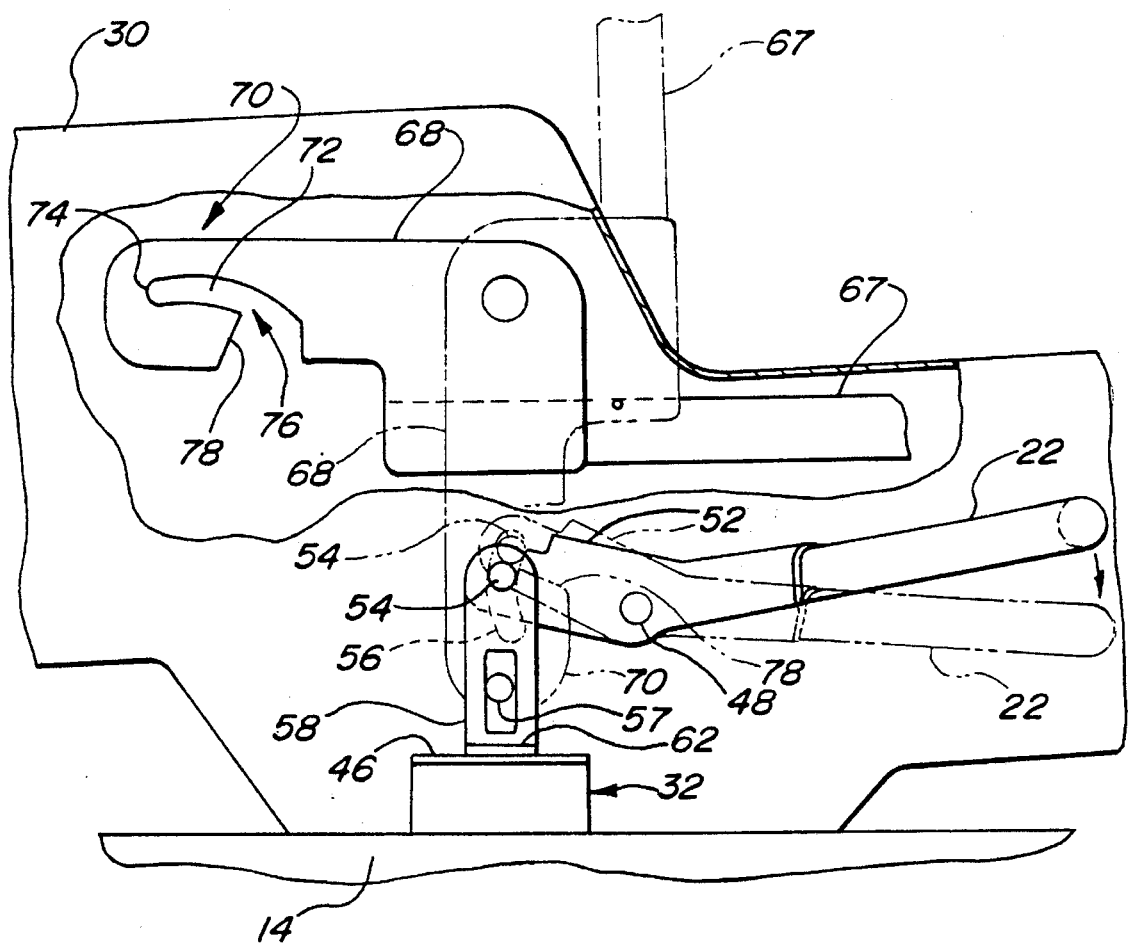
FIG. 5 is a side elevational view of the latch showing the pawls and latch plates.

With reference to FIG. 5, the latch operation, as it relates to the cushion, is shown and described. The cushion 16 is mounted to the riser 30 at an aperture 65 for rotation about pivot pin 66 having a pivot axis 69 parallel to the axis 49. The cushion frame 67 includes a cushion latch plate 68 which rotates with the cushion. The cushion latch plate 68 has a hooked end portion 70 defined by an arcuate slot 72 closed at one end 74 and opened at the opposite end 76. The slot 72 extends generally radial relative to the pivot axis 49. In the upright non-operative position of the cushion, the cushion latch plate is disposed within the fork 53 in the rear extension 52 of the operating handle 22. The pin 54 carried by the operating handle is disposed within the slot 72, below its open end 76. The disposition of the pin 54 in the slot 72 prevents the rotation of the latch plate 68, and hence, prevents rotation of the cushion from its non-operative position to its operative position.

The cushion is released by lowering the front end of the handle 22, raising the pin 54 out of the slot 72 through the slot open end 76. With the pin 54 removed from the latch plate; 68, the cushion can be rotated in a clockwise direction about the pivot 66 as viewed in FIG. 5. Upon return of the cushion to its upright non-operative position, the ramp surface 78, at the open end 76 of the slot 72 engages the pin 54. The pin slides across the ramp surface 78 until the pin 54 reaches the slot 72 where it returns to its neutral position in the slot 72, holding the cushion in the upright non-operative position.

With the cushion latched in its upright position, the fore and aft position of the seat is adjusted by raising the operating handle, causing the pin 54 to move downward through the slot 72. Since the pin 54 remains in the slot 72 in the cushion latch plate, the cushion remains latched in its non-operative position while the seat is unlatched from the track 14.

Figure 6:
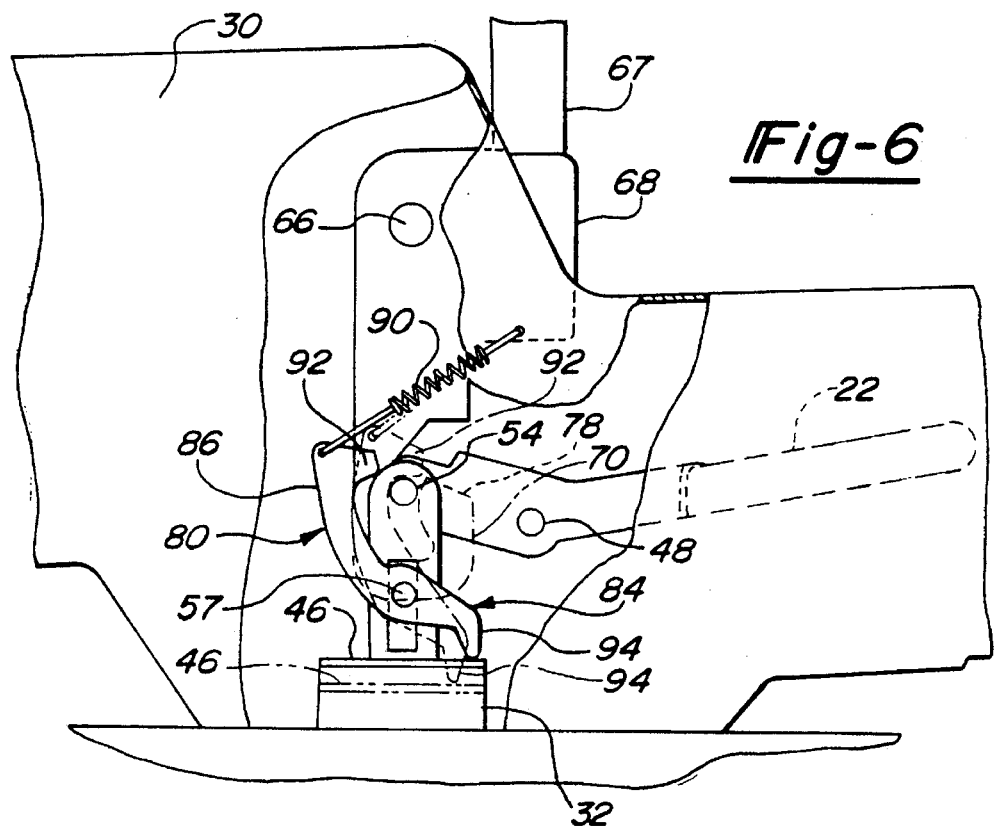
FIG. 6 is a side elevational view of the latch showing the operation of the lockout cam for preventing release of the seat cushion from its non-operative position.

Latch 20 further includes a pair of lockout cams 80, 82 which operate to selectively prevent release of the cushion depending on the location of the seat, and release of the slide car depending on the position of the cushion. With reference to FIG. 6, the lockout cam 80 is shown which operates to prevent release of the cushion except when the seat is located at one of the seat use locations. The cam 80 has a pair of fingers, lower finger 84 and upper finger 86, extending generally in opposite directions from the aperture 88 used to mount the cam 80 on the pivot 57. The cam 80 is biased in a clockwise direction by a tension spring 90 coupled to the upper finger 86 and to the riser 30 to rotate the cam clockwise as shown in FIG. 5. The upper finger 86 has a forward extending catch 92 which rests above the pin 54 when the operating handle is in the neutral position. This prevents upward movement of the pin 54 out of the slot 72 in the cushion latch plate 68. Thus, when the cam is positioned with the catch 92 over the pin 54, the cushion cannot be released from its non-operative position.

The lower finger 84 of the cam 80 extends downward to a distal end 94 which is above the ledge 46 of the seat latch track pawl 32. When the slide car 31 is at a storage location for the seat and the seat latch pawl shod teeth 36 below the top wall 26 of the track 14, the ledge 46 of the seat latch pawl is spaced from the distal end 94 of the cam 80. Furthermore, when the slide car is between storage and use locations, both the teeth 34, 36 are beneath the track top wall such that the seat latch pawl ledge 46 remains spaced below the cam 80. With the seat latch pawl spaced beneath the cam 80, the spring 90 will bias the cam 80 into the position where the catch 92 is above the pin 54, preventing upward movement of the pin.

However, when the slide car is at a use location of the seat, both teeth 34, 36 will project through the track top wall and the seat latch pawl 32 will be in its raised position. The ledge 46 of the pawl 32 is now high enough to contact the distal end 94 of the cam and to rotate the cam counter-clockwise in opposition to spring 90. This moves the catch 92 away from the pin 54, enabling the pin to be raised and release the cushion from its non-operative position. The cam 80 thus functions as a means for preventing the release of the cushion unless the slide car is at a use location of the seat 10.

Figure 7:
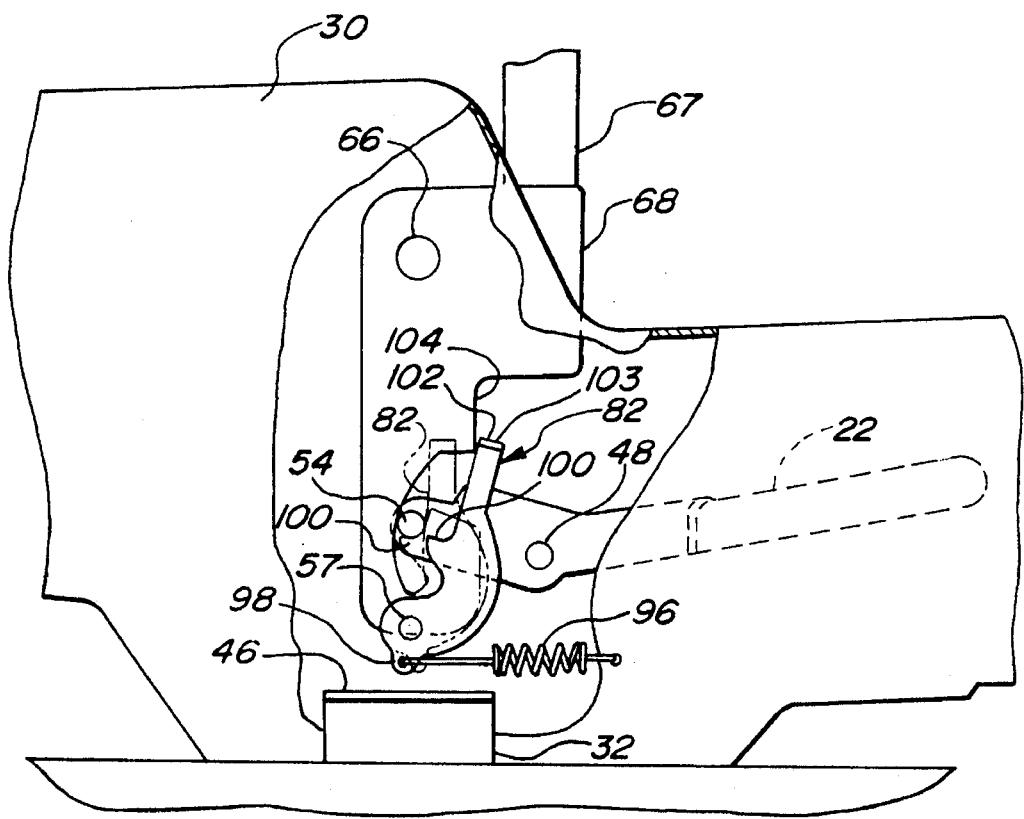
FIG. 7 is a side elevational view of the latch showing the operation of the other lockout cam for preventing movement of the seat unless the seat cushion is in its non-operative position.

With reference to FIG. 7, another cam 82 is shown which is also mounted to the pivot 57. The cam 82 principally extends upwardly from the pivot 57 and is biased in a counter-clockwise direction by a spring 96 coupled to a small downward projection 98 on the cam 82, below the pivot 57. A rearward facing catch 100 is located immediately below the pin 54 when the operating handle 22 is in its neutral position. The spring 96 biases the cam 82 against the pin 54. The catch 100 prevents downward movement of the pin 54 necessary to move pusher 58 downward and release the seat latch pawl 32. Cam 82 further includes a horizontal and inwardly extending tab 102 at its upper end 103. When the cushion is in its upright non-operative position, an edge portion 104 of the cushion latch plate 68 engages the tab 102, rotating the cam 82 clockwise and removing the catch 100 from the path of the pin 54. This enables the pin 54 to be lowered to release the slide car for movement. Thus, the cam 82 serves as means for preventing the release of the slide car, and movement of the seat 10 from a use location unless the cushion 16 is in its upright non-operative position.

As can be seen, the latch 20 functions through a single operating handle 22 and locks both the cushion in its upright non-operative position as well as the seat at the use and storage locations. In addition, the latch 22 prevents movement of the seat from a use location unless the cushion is in its non-operative position and also prevents release of the cushion from its non-operative position unless the seat is positioned at one of the use locations.

The latch 20 has been shown and described in relation to one of the tracks 14 in the vehicle floor. The latch 20 includes an identical mechanism on the opposite side of the seat to which the opposite end of the towel bar operating handle 22 is attached for simultaneous operation. The latch 20 has been shown and described in relation to the movement of the cushion between operative and non-operative positions. However, the broad concept of the invention of a single latch operable by a single operating handle to both lock a seat in use and storage locations as well as to control movement of a seat component between an operative position and a non-operative position, can be utilized with the back rest or any other seat component, if so desired.

It is to be understood that the invention is not limited to the exact construction illustrated and described above, but that various changes and modifications may be made without departing from the spirit and scope of the invention as defined in the following claims.

We claim:

1. A seat assembly for use within a vehicle body, said seat assembly comprising:

a seat including a body supporting cushion with a generally horizontal operative position, a back rest with a generally upright operative position extending upwardly behind said cushion and means for moving one of said cushion and back rest to a non-operative storage position;

means for moving said seat relative to the vehicle body between at least one use location for use of said seat by a passenger and at least one storage location for storage of said seat; and latch means for locking said one of said cushion and said back rest in said non-operative storage position and for locking said seat to the vehicle body in said use and storage locations, said latch means including a single operating handle, said operating handle being selectively movable in a first direction to release said one of said cushion and said back rest for movement from said non-operative position and said operating handle being selectively movable in a second direction to release said seat for movement between said use and storage locations.

2. The seat assembly of claim 1 wherein said latch means includes means for preventing the release of said one of said cushion and said back rest for movement from said non-operative position when said seat is not in said at least one use location and said latch means includes means for preventing the release of said seat for movement from said use location unless said one of said cushion and said back rest is in said non-operative position.

3. The seat assembly of claim 1 wherein said latch means includes:

a first latch plate secured to said one of said cushion and said back rest and a movable first latch pawl engagable with said first latch plate in a locking engagement to hold said first latch plate and said one of said cushion and said back rest in said non-operable position;

a seat latch plate adapted to be secured to the vehicle body and a movable seat latch pawl engagable with said seat latch plate in a locking engagement to hold said seat in said use and storage locations;

said single operating handle being operatively coupled to said latch pawls for selectively moving said latch pawls from engagement with said latch plates respectively;

first lockout means responsive to the location of said seat in the vehicle body for preventing disengagement of said first latch pawl from said first latch plate necessary for movement of said one of said cushion and said back rest from said non-operative position unless said seat is in one of said at least one use locations; and second lockout means responsive to the position of said one of said cushion and said back rest for preventing disengagement of said seat latch pawl from said seat latch plate necessary for movement of said seat from said at least one use location unless said one of said cushion and said back rest is in said non-operative position.

4. The seat assembly of claim 3 wherein said first lockout means includes a first cam for preventing said first latch pawl from being disengaged from said first latch plate unless said seat is in one of said at least one use locations; and said second lockout means includes a second cam for preventing said seat latch pawl from being disengaged from said seat latch plate unless said one of said cushion and said back rest is in said non-operative position.

5. A seat assembly for use within a vehicle body having a floor structure, said seat assembly comprising:

an elongated fixed track adapted to be secured to the floor structure;

a slide car slidably carried by said fixed track for movement along said fixed track;

a generally upright back rest mounted to said slide car for movement along with said slide car;

a body supporting cushion mounted to said slide car for movement between a generally horizontal operative position extending forward from said seat back rest in which a passenger can be seated upon said cushion and a non-operative position in which a passenger cannot be seated upon said cushion;

said slide car having at least one use location along said slide track designated for use of the seat assembly by a passenger and at least one storage location along said slide track designated for storage of said seat assembly without use by a passenger; and latch means for locking said cushion in said non-operative storage position and for locking said slide car in said use and storage locations, said latch means including a single operating handle, said handle being selectively movable in a first direction to release said cushion for movement from said non-operative position and said handle being selectively movable in a second direction to release said slide car for movement between said use and storage locations.

6. The seat assembly of claim 5 wherein said latch means includes means for preventing the release of said cushion from said non-operative position when said slide car is not in said at least one use location and said latch means including means for preventing the release of said slide car for movement from said use location unless said cushion is in said non-operative position.

7. The seat assembly of claim 5 wherein said latch means includes:

a seat latch pawl carried by said slide car and engagable with said fixed track in a locking arrangement to hold said slide car in said use and storage locations;

a cushion latch plate mounted to said cushion and movable therewith; and a cushion latch pawl carried by said slide car and engagable with said cushion latch plate in a locking arrangement to hold said cushion in said non-operative position;

said seat latch pawl and said cushion latch pawl being separately movable by said operating handle to positions disengaged from said fixed track and said cushion latch plate respectively to release said slide car and said cushion respectively.

8. The seat assembly of claim 7 wherein said latch means includes:

first lockout means for preventing release of said cushion from said non-operative position unless said slide car is in said at least one use location; and second lockout means for preventing release of said slide car from said at least one use location unless said cushion is in said non-operative position.

9. The seat assembly of claim 8 wherein said single operating handle is rotatable about a transverse first axis in said first direction from a neutral position to a cushion release position to disengage said cushion latch pawl from said cushion latch plate and said single operating handle is rotatable about said axis in said second direction from a neutral position to a slide car release position to disengage said seat latch pawl from said fixed track.

10. The seat assembly of claim 9 wherein:

said cushion latch pawl comprises a pin extending from said operating handle parallel to said first axis and spaced from said first axis so as to move along an arc of rotation about said axis as said operating handle is moved between said neutral and said release positions; and said first lockout means includes a first cam having a lock position engaging said pin on one side to prevent movement of said handle in said first direction to prevent release of said cushion and means for moving said first cam to a release position disengaged from said pin when said slide car is in said at least one use location; and said second lockout means includes second cam having a lock position engaging said pin on an opposite side to prevent movement of said handle in said second direction to prevent release of said slide car and means for moving said second cam to a release position disengaged from said pin when said cushion is in said non-operative position.

11. The seat assembly of claim 10 wherein:

said cushion is rotatable about a second axis parallel to said first axis and said cushion latch plate is generally normal to said second axis and has a slot spaced from said second axis and generally radial relative to said second axis, said slot being open at one end for receiving said pin therein when said cushion is in said non-operative position to prevent rotation of said cushion, said pin being removable from said slot through said open end for releasing said cushion from said non-operative position upon movement of said handle in said first direction;

said track has a top wall with a pair of apertures at said at least one use location and a third aperture at said at least one storage location;

said seat latch pawl is disposed in said track and said seat latch pawl has first and second extending teeth with said first tooth extending a greater distance than said second tooth, said seat latch pawl having a raised position in which said teeth extend through said pair of apertures in said top wall at said at least one use location to lock said slide car at said at least one use location, said seat latch pawl having an intermediate position with only said first tooth extending through said third aperture in said top wall at said at least one storage position to lock said slide car in said at least one storage position, and said seat latch pawl having a lowered position with neither teeth extending through said top wall for release of said slide car for movement along said track, said seat latch pawl further having an upper portion extending above said track top wall and above said teeth; and said latch means further including a pusher carried by said pin and movable generally downwardly with rotation of said handle in said second direction to engage said seat latch pawl upper portion to move said seat latch pawl downward to said lowered position to remove said teeth from said apertures in said top wall to release said slide car for movement along said track.

12. The seat assembly of claim 11 wherein:

said seat latch pawl upper portion engages said first cam to move said first cam away from said pin when said seat latch pawl is in said raised position with said teeth extending through said pair of apertures in said top wall at said at least one use location whereby said handle is free to move in said first direction to release said cushion from said non-operative position; and said cushion latch plate has an edge portion engagable with said second cam when said cushion is in said non-operative position to move said second cam away from said pin when said cushion is in said non-operative position whereby said handle is free to move in said second direction to release said seat for movement along said track.

13. A seat assembly for use within a vehicle body having a floor structure, said seat assembly comprising:

an elongated fixed track adapted to be secured to the vehicle floor structure;

a seat movable along said track, said seat including a generally upright back rest and a body supporting cushion, said cushion having a generally horizontal operative position extending forward from said back rest in which a passenger can be seated upon said cushion and said cushion being rotatable to a non-operative position in which a passenger cannot be seated upon said cushion;

said seat being movable along said track between at least one use location designated for use of the seat assembly by a passenger and at least one storage location designated for storage of said seat assembly without use by a passenger; and latch means for locking said cushion in said non-operative storage position and for locking said seat in said use and storage locations, said latch means including a single operating handle which is selectively rotatable about a transverse first axis from a neutral position in a first direction to release said cushion for movement from said non-operative position and in a second direction to release said seat for movement between said use and storage locations, said latch means further including means for preventing the release of said cushion from said non-operative position when said seat is not in said at least one use location and means for preventing the release of said seat for movement from said use location unless said cushion is in said non-operative position.

14. The seat assembly of claim 13 wherein:

said latch means includes a transversely extending pin carried by said handle parallel to said first axis at a distance from said first axis for movement along an arc as said handle is moved in said first and second directions;

said cushion rotates about a second axis parallel to said first axis and said cushion has a cushion latch plate generally normal to said second axis and having a slot spaced from said second axis and being generally radial relative to said second axis, said slot being open at one end for receiving said transverse pin therein when said cushion is in said non-operative position to prevent rotation of said cushion, said pin being removable from said slot through said open end for releasing said cushion from said non-operative position upon movement of said handle in said first direction;

said track having a top wall with a pair of apertures at said at least one use location and a third aperture at said at least one storage location;

said latch means further including a vertically movable seat latch pawl disposed in said track, said seat latch pawl having first and second extending teeth with said first tooth extending a greater distance than said second tooth, said seat latch pawl having a raised position in which said teeth extend through said pair of apertures in said top wall at said at least one use location to lock said seat at said at least one use location, said seat latch pawl having an intermediate position with only said first tooth extending through said third aperture in said top wall at said at least one storage position to lock said seat in said at least one storage position, and said seat latch pawl having a lowered position with neither teeth extending through said top wall for release of said seat for movement along said track, said seat latch pawl further having an upper portion extending above said track top wall and above said teeth; and said latch means further including a pusher carried by said pin and movable generally downwardly with rotation of said handle in said second direction to engage said seat latch pawl vertical portion to move said seat latch pawl downward to said lowered position to remove said teeth from said apertures in said top wall to release said seat for movement along said track.

15. The seat of claim 14 wherein said means for preventing the release of said cushion from said non-operative position when said seat is not in said at least one use location includes a first cam having a lock position in which said first cam engages said pin on one side to prevent movement of said handle in said first direction to prevent release of said cushion; and said seat latch pawl upper portion engaging said first cam to move said first cam away from said pin when said seat latch pawl is in said raised position with said teeth extending through said pair of apertures in said top wall at said at least one use location whereby said handle is free to move in said first direction to release said cushion from said non-operative position.

16. The seat of claim 15 wherein said means for preventing the release of said seat for movement from said use location unless said cushion is in said non-operative position includes a second cam having a lock position engaging said pin on an opposite side to prevent movement of said handle in said second direction to prevent release of said seat; and said cushion latch plate has an edge portion engagable with said second cam when said cushion is in said non-operative position to move said second cam away from said pin when said cushion is in said non-operative position whereby said handle is free to move in said second direction to release said seat for movement along said track.

* * * * *